US005878568A

United States Patent [19]

Chuang

[11] Patent Number: 5,878,568

[45] Date of Patent: Mar. 9, 1999

[54] PNEUMATIC TOOL

[76] Inventor: Chia-Chiung Chuang, 3F, No. 22, Lane 337, Sung-Chu Road, Taichung, Taiwan

[21] Appl. No.: 53,847

[22] Filed: Apr. 2, 1998

[51] Int. Cl.[6] ........................................ F16D 31/02

[52] U.S. Cl. ........................................ 60/407; 60/469

[58] Field of Search ........................................ 60/325, 407, 469

[56] References Cited

U.S. PATENT DOCUMENTS

| | | | |
|---|---|---|---|
| 4,614,085 | 9/1986 | Neukomm | 60/407 X |
| 5,609,028 | 3/1997 | Kakuda et al. | 60/407 |

FOREIGN PATENT DOCUMENTS

| | | | |
|---|---|---|---|
| 1221543 | 1/1960 | France | 60/407 |

*Primary Examiner*—Hoang Nguyen

*Attorney, Agent, or Firm*—Browdy and Neimark

[57] ABSTRACT

A pneumatic tool of the front exhaust type is composed of a main body, a rotary end member, a connection member, three leakproof rings, a noise reducing plate, and a flow adjusting set. The main body has a tubular extension portion. The rotary end member has a body provided with a first hole and a second hole. The first hole has a hole diameter greater than the outer diameter of the tubular extension portion, and a length equal to the length of the tubular extension portion. The second hole is in communication with the first hole and is greater in hole diameter than the first hole. The connection member is received in the tubular extension portion via the second hole. The connection member has a threaded portion provided with at least one leakproof ring so as to enable the connection member to be fastened pivotally with the rotary end member when the connection member is fastened with the tubular extension portion.

8 Claims, 3 Drawing Sheets

PNEUMATIC TOOL

FIELD OF THE INVENTION

The present invention relates generally to a hand tool, and more particularly to a pneumatic tool.

BACKGROUND OF THE INVENTION

The conventional pneumatic tool is generally composed of a housing in which an air chamber and an air duct are located. The air duct is in communication with the air chamber in which a fan blade is located such that the fan blade is linked with a working portion. The compressed air is guided into the air chamber to drive the fan blade so as to work the working portion.

Such conventional pneumatic tool as described above is defective in design in that it makes use of a tubular body to connect the air duct and the source of the compressed air, and that a rotary joint is used to connect the tubular body and the housing. The rotary joint is often the source of trouble in view of the fact that the rotary joint can not meet the specification requirements of the pneumatic tool, and that the rotary joint is vulnerable to leak after the prolonged use of the pneumatic tool. In addition, the conventional pneumatic tool is provided with an extended air exhaust tube for reducing the noise level of the pneumatic tool. However, such extended air exhaust tube hardly works to reduce the noise level. Moreover, the air duct of the conventional pneumatic tool is provided with a flow adjusting cross rod for regulating the flow of the compressed air. In operation, the flow adjusting cross rod must be pulled along the axial direction and then rotated radially. In other words, the flow adjusting cross rod complicates the operation of the conventional pneumatic tool.

SUMMARY OF THE INVENTION

The primary objective of the present invention is therefore to provide an improved pneumatic tool free from the drawbacks of the conventional pneumatic tool described above.

In keeping with the principle of the present invention, the foregoing objective of the present invention is attained by a pneumatic tool consisting of a main body, a rotary end member, a connection member, three leakproof rings, a noise reducing plate, and a flow adjusting set. The pneumatic tool is characterized in design in that the main body has a tubular extension portion extending from the air inlet, and that the rotary end member has a body provided with a first hole and a second hole. The first hole has a hole diameter greater than the outer diameter of the tubular extension portion, and a length equal to the length of the tubular extension portion. The second hole is in communication with the first hole and is greater in hole diameter than the first hole, and further that the connection member is received in the tubular extension portion via the second hole in such a way that a threaded portion of the connection member is provided with at least one leakproof ring so as to enable the connection member to be fastened pivotally with the rotary end member.

DETAILED DESCRIPTION OF THE INVENTION

Figure 1:
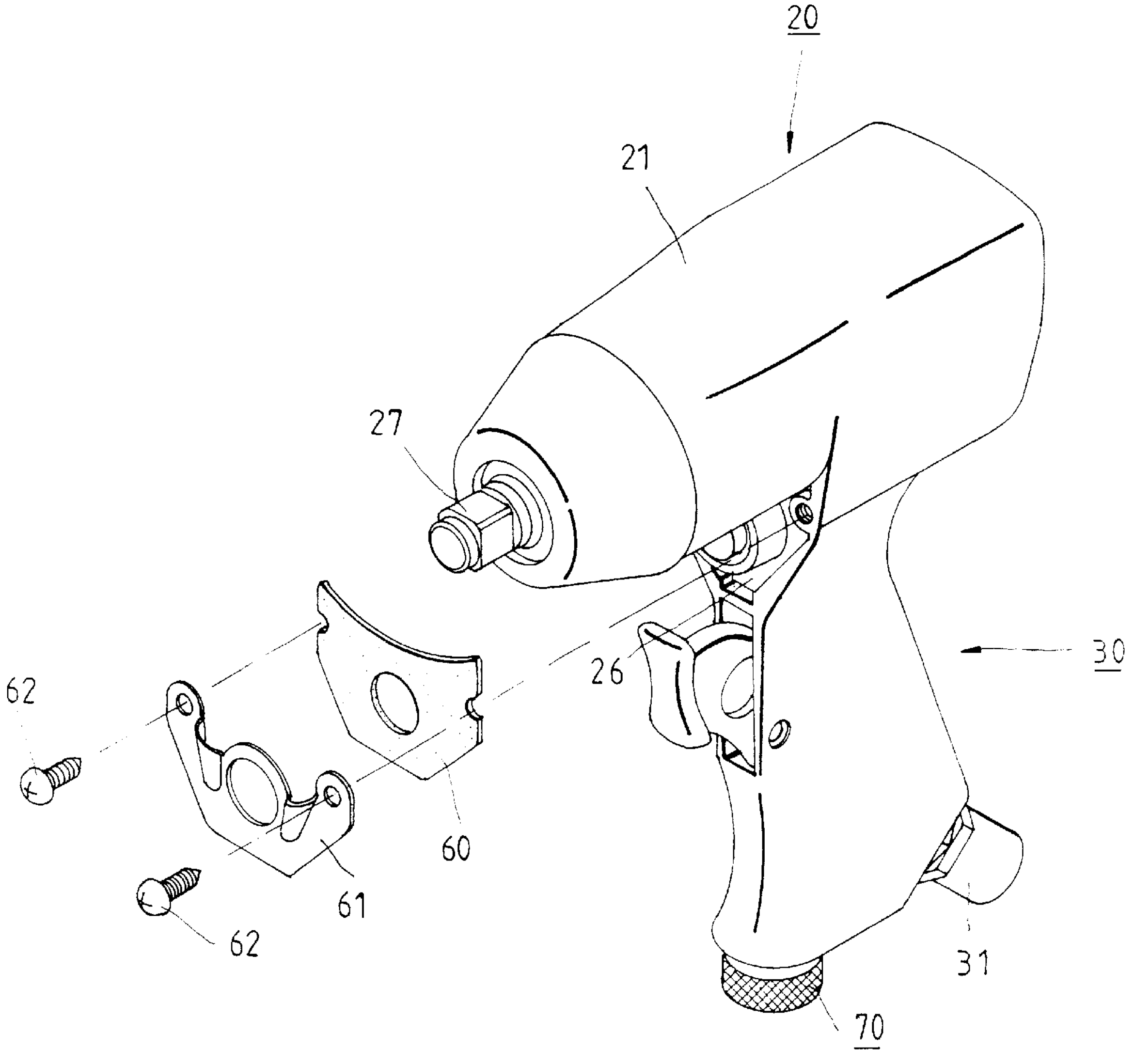
FIG. 1 shows an exploded view of the present invention.
Figure 2:
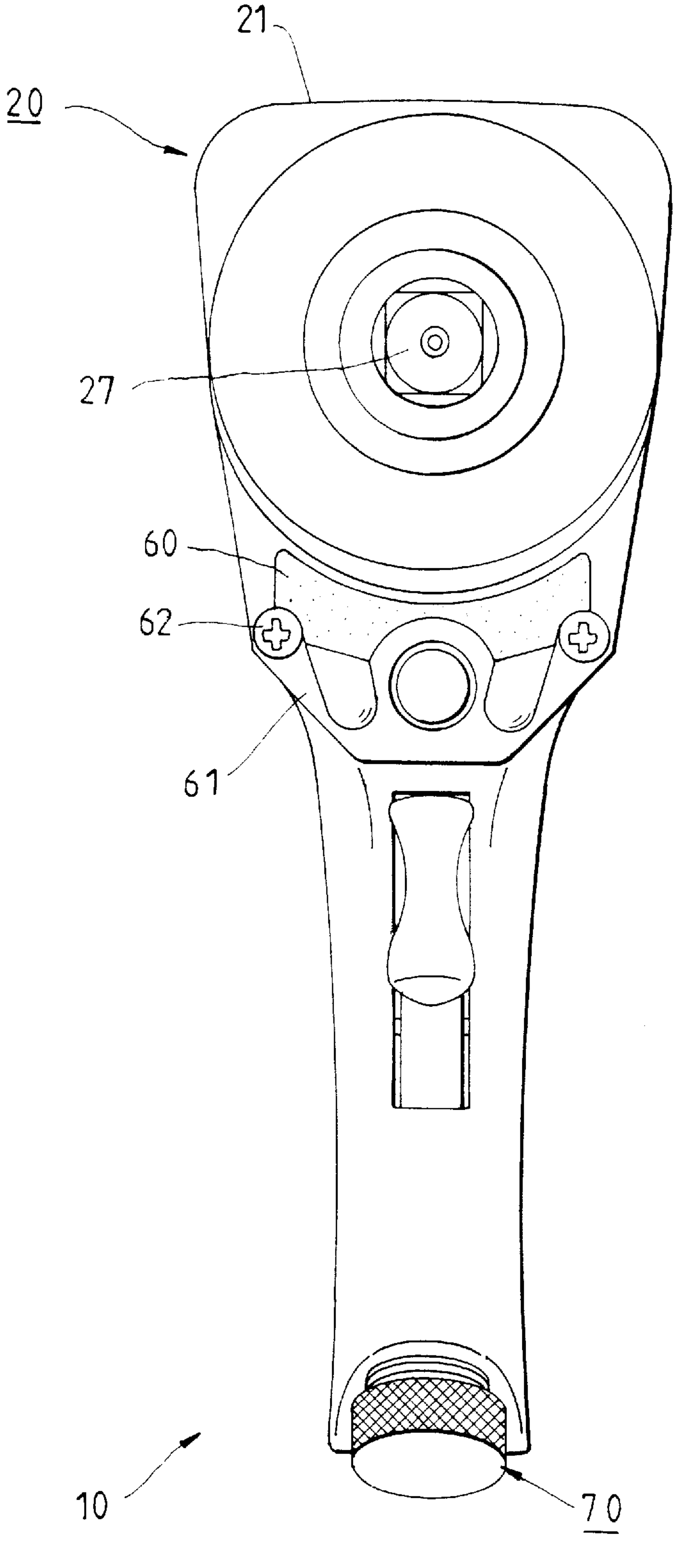
FIG. 2 shows a front view of the present invention in combination.
Figure 3:
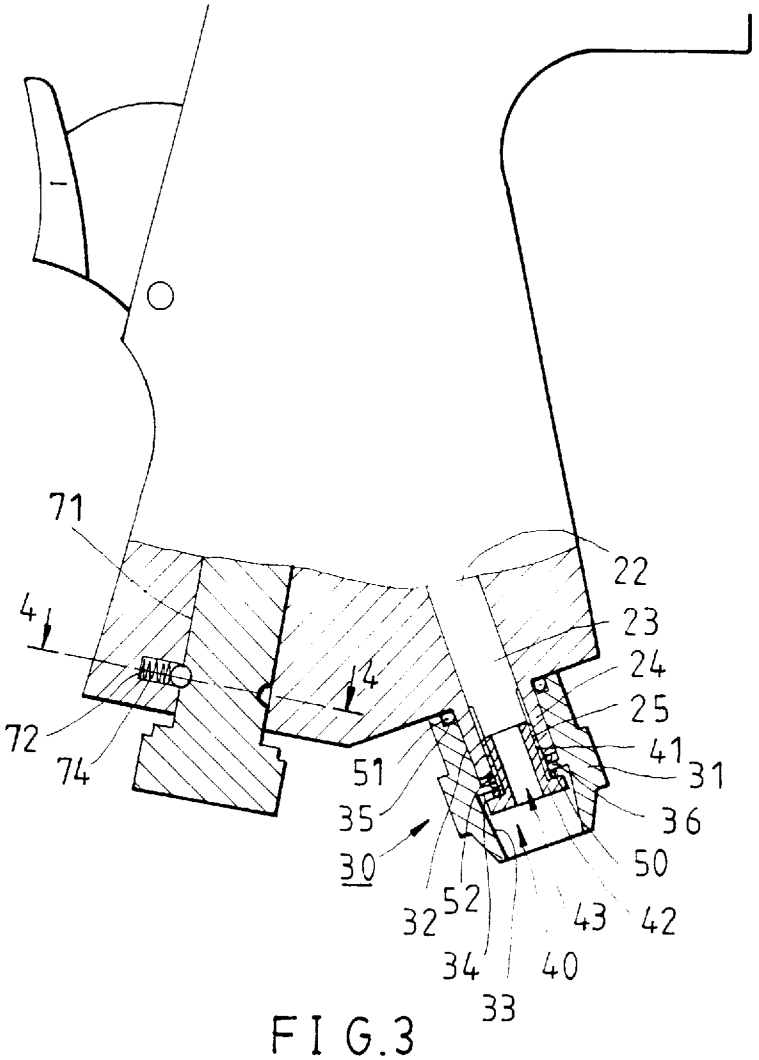
FIG. 3 shows a sectional schematic view of the rotary end member of the present invention.

As shown in all drawings provided herewith, a pneumatic tool 10 of the present invention is similar in drive mechanism to the conventional pneumatic tool of the front exhaust type and is characterized in that it is composed of a main body 20, a rotary end member 30, a connection member 40, three leakproof rings 50, 51 and 52, a noise reducing plate 60, and a flow adjusting set 70.

The main body 20 has a housing 21 similar in shape to a pistol and having an air duct 22 extending from an air inlet 23 of the housing 21 to an air chamber (not shown in the drawings). The atmospheric air is drawn into the air chamber via the air inlet 23 and the air duct 22 to drive a fan blade set (not shown in the drawing). The housing 21 is further provided with a tubular extension portion 24 extending from the bottom of the housing 21 such that the tubular extension portion 24 is coaxially in communication with the air inlet 23. The tubular extension portion 24 is provided in the wall thereof with threads 25. The housing 21 is further provided in the front side thereof with an air outlet 26 corresponding in location to an output shaft 27.

The rotary end member 30 has a tubular body 31 of a hollow construction. The tubular body 31 is provided with a first hole 32 having a hole diameter and a length. The hole diameter of the first hole 32 is greater than the outer diameter of the extension portion 24, and the length of the first hole 32 is greater than the length of the extension portion 24. The extension portion 24 is received in the first hole 32. The tubular body 31 is farther provided with a second hole 33 communicating coaxially with the first hole 32 and having a hole diameter greater than the hole diameter of the first hole 32. The first hole 32 and the second hole 33 are provided therebetween with a circular shoulder 34. The periphery of the open end of the first hole 32 is provided with a circular retaining slot 35. The first hole 32 is farther provided with a circular protuberance 36 contiguous to the second hole 33.

The connection member 40 is a bolt having an empty space extending along the axial direction thereof and a threaded portion 41 which is engaged with the threads of the hollow extension portion 24 via the second hole 32 such that the bottom end of the threaded portion 41 is engaged with a nut 42 opposite in location to the shoulder 34. The connection member 40 is provided with an axial through hole 43.

Three leakproof rings 50, 51 and 52 are made of a material of giant molecules. The leakproof ring 50 is fitted over the threaded portion 41 and located between the nut 42 and the shoulder 34 for enabling the rotary end member 30 and the extension portion 24 to be fastened pivotally at such time when the connection member 40 is engaged with the extension portion 24. The leakproof ring 51 is retained in the circular retaining slot 35 such that the leakproof ring 51 is held between the top end of the tubular body 31 and the bottom of the housing 21. The leakproof ring 52 is held between the bottom of the extension 24 and the circular protuberance 36. The rotary end member 40 is capable of rotating on the extension portion 24 to form an air passageway.

As shown in FIG. 1, the noise reducing plate 60 is made of copper by sintering and is fastened to the open end of the air outlet 26 by means of a cover plate 61 and a plurality of screws 62. The noise reducing plate 60 is capable of alleviating the level of noise brought about by the air which is released from the main body 20.

Figure 4:
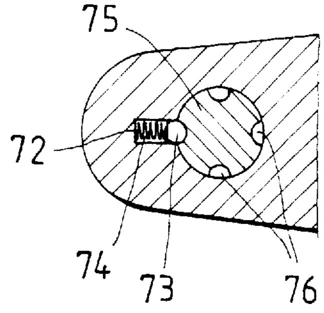
FIG. 4 shows a sectional view of a portion taken along the direction indicated by a line 4—4 as shown in FIG. 3.

The flow adjusting set 70 has a receiving hole 71 extending from a side wall of the air duct 22 to the bottom of the housing 21. The receiving hole 71 is provided in the wall thereof with a blind hole 74 in which a spring 72 and a retaining ball 73 are located. An adjustment rod 75 is located in the receiving hole 71 for adjusting the air flow in the air duct 22. The adjustment rod 75 is provided with a plurality of retaining holes 76 for retaining the ball 73, as shown in FIG. 4, for locating the adjustment rod 75 at a position.

The pneumatic tool of the present invention has advantages over the conventional pneumatic tool. For example, the present invention has the rotary end member 30 to facilitate the connecting of the present invention with the source of the compressed air, without the risk of air leak. In addition, the present invention has the noise reducing plate 60 capable of an effective reduction in noise brought about by the pneumatic tool of the front exhaust type. Moreover, the present invention has the flow adjusting set 70 consisting of an adjustment rod 75 to facilitate the adjusting of the compressed air flow.

What is claimed is:

1. A pneumatic tool comprising:

a main body having a housing, an air duct extending from one side of said housing into an interior of said housing, and an air inlet coaxially communicating with said air duct for admitting the compressed air to said air duct;

wherein said main body has a tubular extension portion extending from a portion corresponding in location to said air inlet in the direction toward the outside of said housing;

wherein said main body further comprises:

a rotary end member having a body with extending from one side of said rotary end member and having a first hole diameter greater than an outer diameter of said extension portion, said first hole having a length being at least equal to a length of said extension portion, said extension portion being located in said first hole, said body further provided with a second hole extending from another side of said rotary end member such that said second hole is coaxially in communication with said first hole, and that said second hole and said first hole are provided therebetween with a shoulder, said second hole having a hole diameter greater than the hole diameter of said first hole;

a connection member having a rod portion extending into said extension portion via said second hole, said rod portion being engaged at one end thereof with a nut which is located in said second hole such that said rod portion is in contact with said shoulder, said connection member further having an axial through hole; and at least one leakproof ring fitted over said rod portion such that said leakproof ring is located between said nut and said shoulder for enabling said connection member to be fastened pivotally with said rotary end member when said connection member is fastened with said extension portion.

2. The pneumatic tool as defined in claim 1, wherein said first hole is provided at an open end thereof with a retaining slot for retaining a leakproof ring.

3. The pneumatic tool as defined in claim 1, wherein said first hole has a length greater than a length of said extension portion, and a circular protuberance in contact with one end of said extension portion.

4. The pneumatic tool as defined in claim 3, wherein said circular protuberance and said one end of said extension portion are provided therebetween with a leakproof ring.

5. The pneumatic tool as defined in claim 1, wherein said rod portion of said connection member is provided in an outer wall thereof with threads; and wherein said extension portion is provided in an inner wall thereof with threads which are engaged with said threads of said rod portion of said connection member.

6. The pneumatic tool as defined in claim 1, wherein said housing is provided with an air outlet facing a workpiece and having a noise reducing plate fastened thereto.

7. The pneumatic tool as defined in claim 6, wherein said noise reducing plate is made of copper by sintering.

8. The pneumatic tool as defined in claim 1 further comprising a flow adjusting set having a receiving hole extending from a side wall of said air duct to a bottom of said housing, said receiving hole provided in a wall thereof with a blind hole for locating a spring and a retaining ball, said flow adjusting set further having an adjustment rod which is located in said receiving hole for adjusting air flow in said air duct and is provided with a plurality of retaining holes capable of retaining said retaining ball for locating said adjustment rod at a position.

* * * * *